United States Patent Office 3,509,177
Patented Apr. 28, 1970

3,509,177
ALKYLENE AND ARYLENEBIS(3-CARBAMOYL-4-HYDROXYCOUMARIN)S
John S. McIntyre, Sarnia, Ontario, and Allan R. Knight, Petrolia, Ontario, Canada, assignors to The Dow Chemical Company, Midland, Mich., a corporation of Delaware
No Drawing. Filed June 24, 1968, Ser. No. 739,150
Int. Cl. A01n 9/28; C07d 7/28
U.S. Cl. 260—343.2                8 Claims

ABSTRACT OF THE DISCLOSURE

The present disclosure is directed to alkylene and arylenebis(3-carbamoyl-4-hydroxycoumarin)s wherein the alkylene or arylene group is attached between the two amine functions and consists of an alkylene group of 1 to 4 carbon atoms, phenylene and methylphenylene and to the corresponding bis-compound wherein the two amine functions are directly connected together. The method of preparation as well as the utility of the compounds as pesticides is taught.

SUMMARY OF THE INVENTION

The present invention relates to a novel and useful group of substituted bis(3-carbamoyl-4-hydroxycoumarin)s. It is more particularly concerned with a new series of alkylene- and arylene-bis(3-carbamoyl-4-hydroxycoumarin)s. This series of compounds can be represented by the Formula I:

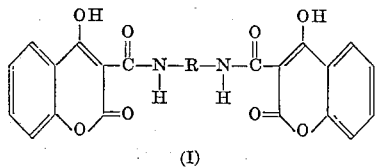

(I)

In this and succeeding formulas, R represents alkylene groups of 1 to 4 carbon atoms, phenylene and methylphenylene.

The compound 1,2-bis((4-hydroxy-2-oxo-2H-1-benzopyran-3-yl)carbonyl)hydrazine contains no R substitution and is represented by the Formula II:

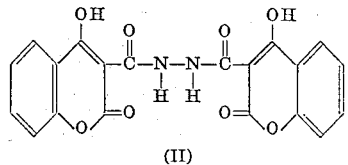

(II)

The compounds of the present invention are crystalline or powdery solids and are useful as pesticides for the control of a wide variety of pests such as the bacterial and fungal organisms *Staphylococcus aureus, Bacillus subtilis* and *Mycobacterium phlei;* insect pests such as two-spotted spider mites and roaches and plant pests such as spiny clotbur and pigweeds.

Representative bis(3 - carbamoyl-4-hydroxycoumarin)s of the invention include 1,2-bis((4-hydroxy-2-oxo-2H-1-benzopyran-3-yl)
  carbonyl)hydrazine,
N,N'-methylenebis(3-carbamoyl-4-hydroxycoumarin),
N,N'-ethylene-bis(3-carbamoyl-4-hydroxycoumarin),
N,N'-propylene-bis(3-carbamoyl-4-hydroxycoumarin),
N,N'-trimethylene-bis(3-carbamoyl-4-hydroxycoumarin),
N,N'-butylene-2,3-bis(3-carbamoyl-4-hydroxycoumarin),
N,N'-tetramethylene-bis(3-carbamoyl-4-hydroxy-
  coumarin),
N,N'-phenylene-1,4-bis(3-carbamoyl-4-hydroxy-
  coumarin) and N,N'-4-methylphenylene-1,3-bis(3-carbamoyl-4-
  hydroxycoumarin).

The N,N'-methylenebis(3-carbamoyl-4-hydroxycoumarin) of the invention is prepared by the base condensation of 3-carbamoyl-4-hydroxycoumarin with methylene dibromide. The reaction is conducted in the presence of a base inert to methylene dibromide such as triethylamine. Other tertiary alkylamines and bases which are inert to methylene dibromide would give a smooth condensation. The amount of the reactants to be employed is not critical, some of the product being formed when employing any proportions. The reaction consumes the reactants, however, in the ratio of two moles of the 3-carbamoyl-4-hydroxycoumarin per mole of methylene dibromide and the employment of such proportions is preferred.

The amount of base employed is not critical and is usually employed in an amount sufficient to insure a complete reaction.

In carrying out this reaction, the 3-carbamoyl-4-hydroxycoumarin, methylene dibromide and triethylamine or other suitable base are contacted and maintained together in any convenient fashion. The reaction is allowed to proceed at a temperature between 50° and 125° C. and is preferably maintained at the reflux temperature of the reaction mixture. The pressure is not critical and is usually maintained at ambient atmospheric pressure. The reaction is allowed to proceed until a solid is formed, usually within about 2–3 hours. The solid product is filtered from the reaction mixture and then washed with methanol.

The 1,2-bis((4-hydroxy-2-oxo-2H-1-benzopyran - 3 - yl) carbonyl)hydrazine of the invention is prepared by the condensation of 3-hydrazinocarbonyl-4-hydroxycoumarin with 3-carboethoxy-4-hydroxycoumarin in a solvent such as nitrobenzene. The amount of the reactants to be employed is not critical, some of the desired product being formed when employing any proportion. The reaction consumes the reactants, however, in the ratio of one mole of the 3-hydrazinocarbonyl-4-hydroxycoumarin per mole of 3-carboethoxy-4-hydroxycoumarin and the employment of such proportions is preferred. In carrying out the reaction, the 3-hydrazinocarbonyl-4-hydroxycoumarin, 3-carboethoxy-4-hydroxycoumarin and nitrobenzene are contacted and maintained together in any convenient fashion. The reaction is allowed to proceed at a temperature maintained between 140° and 150° C. at ambient atmospheric pressure and with stirring. The reaction is allowed to proceed until a solid is formed, usually within 30 minutes. This solid product is filtered from the reaction mixture and then washed with methanol.

The remaining alkylene and arylenebis(3-carbamoyl-4-hydroxycoumarin)s are prepared by the condensation of 3-carboethoxy-4-hydroxycoumarin with the appropriate substituted diamine in a solvent such as nitrobenzene. Representative diamines are ethylenediamine, propylenediamine, 1,3-diaminopropane (trimethylenediamine), 2,3-butylenediamine, tetramethylenediamine, ortho-, meta- or para-phenylenediamine and 2-methyl-1,3-phenylenediamine. The amount of the reactants to be employed is not critical, some of the desired product being formed when the reactants are employed in any proportions. The reaction consumes the reactants in the ratio of two moles of the 3-carboethoxy-4-hydroxycoumarin per mole of the diamine and the employment of such proportions is preferred. The reactants and solvent are contacted and maintained together in any convenient fashion. The reaction mixture is heated and the reaction is allowed to proceed at a temperature maintained between 140° and 150° C. at ambient atmospheric pressure, with stirring, until completion and a solid product is formed. The reaction mass is cooled and the solid product recovered by filtration or any other conventional separation procedure. The product is then washed in methanol.

In an alternative procedure, the compounds may be prepared by the condensation of 3-carboethoxy-4-hydroxycoumarin with the appropriate substituted 3-aminocarbamoyl-4-hydroxycoumarin in a solvent such as nitrobenzene. Representative 3-aminocarbamoyl-4-hydroxycoumarins are 3-(2-aminoethylcarbamoyl) - 4 - hydroxycoumarin, 3-(3-aminopropylcarbamoyl)-4 - hydroxycoumarin, 3-(4-aminophenylcarbamoyl)-4-hydroxycoumarin and 3-(3-amino-4-methylphenylcarbamoyl) - 4 - hydroxycoumarin. The amount of the reactants to be employed is not critical, some of the desired product being formed when the reactants are employed in any proportions. The reaction consumes the reactants in a ratio of one mole of 3-carboethoxy-4-hydroxycoumarin per mole of 3-aminocarbamoyl-4-hydroxycoumarin and the employment of such proportions is preferred. The reactants and solvent are contacted and maintained together in any convenient fashion. The reaction mixture is heated and the reaction is allowed to proceed at a temperature maintained between 140° and 150° C., at ambient atmospheric pressure, with stirring, until completion and a solid product is formed. The solid product is recovered by filtration or any other conventional separation procedure. The product is then washed with a suitable liquid, such as methanol.

In another alternative procedure, the compounds may be prepared by the reaction of 4-hydroxycoumarin with the appropriate substituted diisocyanate in a solvent such as nitrobenzene. Representative substituted diisocyanates include ethylene diisocyanate, trimethylenediisocyanate, tetramethylenediisocyanate, (o-, m-, p-) phenylene diisocyanate and 2,4-toluene diisocyanate. The amount of the reactants to be employed is not critical, some of the desired product being formed when the reactants are employed in any proportions. The reaction consumes the reactants in a ratio of two moles of 4-hydroxycoumarin per mole of diisocyanate and the employment of such proportions is preferred. The reactants and solvent are contacted and maintained together in any convenient fashion. The reaction mixture is heated and the reaction is allowed to proceed at a temperature maintained between 140° and 150° C., at ambient atmospheric pressure, with stirring, for a period of up to one and one-half hours. The reaction mixture is partially cooled and methanol is added to the mixture. The warm mixture is then filtered to recover the solid product.

DESCRIPTION OF SOME PREFERRED EMBODIMENTS

The following examples illustrate the present invention and the manner by which it can be practiced but, as such, should not be construed as limitations upon the overall scope of the same.

Example 1.—N,N'-methylenebis(3-carbamoyl-4-hydroxycoumarin)

2.0 grams (0.010 mole) of 3-carbamoyl-4-hydroxycoumarin, 15.0 grams (0.084 mole) of methylene dibromide and 3.0 grams (0.016 mole) of triethylamine were placed into a boiling flask and heated at atmospheric pressure to the reflux temperature of the mixture for 2–3 hours until the reaction was completed and a solid product was formed. The reaction mixture was filtered while hot to recover this solid product. The solid N,N'-methylenebis(3-carbamoyl - 4 - hydroxycoumarin) product was then washed with methanol and dried. The product, a solid, white powder, was obtained in a yield of 0.68 grams (33 percent) and had a melting point of 268°–270° C., a molecular weight of 422 and was found by analysis to have carbon, hydrogen and nitrogen contents of 59.36, 3.56 and 6.70 percent, respectively, as compared with the theoretical contents of 59.72, 3.31 and 6.64 percent, respectively, calculated for the named structure.

Example 2.—N,N'-trimethylene-bis(3-carbamoyl-4-hydroxycoumarin)

10.0 grams (0.042 mole) of 3-carboethoxy-4-hydroxycoumarin were mixed with 30 milliliters of nitrobenzene. To this mixture 1.55 grams (0.021 mole) of 1,3-diaminopropane were added with stirring. The reaction mixture was heated to and maintained at a temperature of 140°–150° C., at atmospheric pressure with agitation, until the reaction was completed and a solid product was formed. The reaction mixture was cooled and the solid separated by filtration and the N,N'-trimethylene-bis(3-carbamoyl-4-hydroxycoumarin) product was washed with methanol and dried. The product was obtained in a yield of 7.0 grams (74 percent), was a white powder, had a melting point of 284°–286° C. and a molecular weight of 450. The product was found by analysis to have carbon, hydrogen and nitrogen contents of 61.07, 4.18 and 6.40 percent, respectively, as compared with the theoretical contents of 61.33, 4.00 and 6.22 percent, respectively, calculated for the named structure.

Example 3.—N,N'-trimethylene-bis(3-carbamoyl-4-hydroxycoumarin)

1.8 grams (0.0068 mole) of 3-(3-aminopropyl-carbamoyl)-4-hydroxycoumarin and 2.0 grams (0.0085 mole) of 3-carboethoxy-4-hydroxycoumarin were added to 10 milliliters of nitrobenzene. This mixture was then heated to and maintained at a temperature of 140°–150° C. at atmospheric pressure until the reaction was completed and a solid product was formed. The solid was separated by filtration and the N,N'-trimethylene-1,3-bis(3-carbamoyl-4-hydroxycoumarin) product was washed with methanol and dried. The product, a white powder, was obtained in a yield of 2.0 grams (66 percent) and the properties were found to be the same as those found above (Example 2) for this compound.

Example 4.—N,N'-4-methylphenylene-1,3-bis(3-carbamoyl-4-hydroxycoumarin)

40 grams (0.24 mole) of 4-hydroxycoumarin and 21 grams (0.12 mole) of 2,4-toluenediisocyanate were added to 60 milliliters of nitrobenzene containing 1 milliliter of triethylamine. The mixture was then heated to 140° C. at atmospheric pressure and maintained at this temperature for one and one-half hours. The reaction mixture was cooled to 30° C. and diluted with 50 milliliters of methanol. This mixture was then filtered to recover the light yellow crystalline N,N'-4-methylphenylene-1,3-bis(3-carbamoyl-4-hydroxycoumarin) product. The product was obtained in a yield of 47 grams (79 percent) and had a melting point of 286°–287° C., a molecular weight of 498 and was found by analysis to have a carbon, hydrogen and nitrogen content of 65.06, 3.93 and 5.22 percent, respectively, as compared with the theoretical content of 65.06, 3.61 and 5.62 percent, respectively, calculated for the named structure.

In a similar manner, other compounds of the invention are prepared as follows:

1,2 - bis(4 - hydroxy-2-oxo-2H-1-benzopyran-3-yl)carbonyl) hydrazine in a yield of 89 percent by reacting 3-hydrazinocarbonyl - 4 - hydroxycoumarin with 3-carboethoxy-4-hydroxycoumarin in nitrobenzene. Sand colored crystals; molecular weight 408; melting point 298°–300° C.

N,N'-ethylene-bis(3-carbamoyl-4-hydroxycoumarin) in a yield of 97 percent by reacting 3-carboethoxy-4-hydroxycoumarin) with ethylenediamine in nitrobenzene. Off white powder; molecular weight 436; melting point 296°–297.5° C.

Elemental analysis.—Calculated for $C_{22}H_{16}N_2O_8$ (percent): C, 60.55; H, 3.67; N, 6.42. Found (percent): C, 60.21; H, 3.80; N, 6.63.

N,N' - tetramethylene-bis(3 - carbamoyl - 4 - hydroxycoumarin) in a yield of 85 percent by reacting 3-carboethoxy-4-hydroxycoumarin with tetramethylenediamine in nitrobenzene. Off white powder; molecular weight 464; melting point 294°–295° C.

*Elemental analysis.*—Calculated for $C_{24}H_{20}N_2O_8$ (percent): C, 62.06; H, 4.31; N, 6.03. Found (percent): C, 61.76; H, 4.30; N, 6.29.

N,N' - phenylene - 1,4 - bis(3-carbamoyl-4-hydroxycoumarin) in a yield of 87 percent by reacting 3-carboethoxy-4-hydroxycoumarin and 3-(4-aminophenylcarbamoyl)-4-hydroxycoumarin in nitrobenzene. Yellow powder; molecular weight 484; melting point 354° C. dec.

*Elemental analysis.*—Calculated for $C_{26}H_{16}N_2O_8$ (percent): C, 64.46; H, 3.31; N, 5.79. Found (percent): C, 64.55; H, 3.48; N, 5.76.

The compounds of the invention are employed as toxicants in pesticides. For such uses, the compounds can be employed in an unmodified form or dispersed on a finely divided solid and employed as dusts. Such mixtures can also be dispersed in water with or without the aid of a surface-active agent and the resulting aqueous suspensions employed as sprays. In other procedures, the products can be employed as active constituents in solvent solutions, oil-in-water or water-in-oil emulsions or aqueous dispersions. The augmented compositions are adapted to be formulated as concentrates and subsequently diluted with additional liquid or solid adjuvants to produce the ultimate treating compositions. Good results are obtained when employing compositions containing pesticidal concentrations and usually from about 1 to 10,000 parts by weight of one or more of the compounds per million parts of such composition.

In a representative operation, the compounds of the present invention were tested for their activity as pesticides for the control of bacterial and fungal organisms. Separate suspensions of each compound were prepared by adding the compound to isopropanol and then diluting each individual mixture to a concentration of about 500 parts by weight of active compound per million parts of warm melted nutrient agar. The resultant treated nutrient was poured into petri dishes and allowed to solidify. A compound of the invention was the sole toxicant in any one treated nutrient. Check dishes were also prepared from the nutrient agar containing none of the toxicant. Droplets of representative test organism cultures were applied to the agar surface in each petri dish. The inoculated nutrient agar cultures were then incubated for about 48 hours under conditions conducive to growth of the test organisms.

In such operations, 1,2-bis((4-hydroxy-2-oxo-1-benzopyran-3-yl)carbonyl)hydrazine and N,N'-phenylene-1,4-bis(3-carbamoyl-4-hydroxycoumarin) were found to give 100 percent control and kill of *Bacillus subtilis*. In further representative operations, N,N'-ethylene-bis(3-carbamoyl-4-hydroxycoumarin) was found to give 100 percent kill and control of *Mycobacterium phlei* and N,N'-methylene-bis(3-carbamoyl-4-hydroxycoumarin) was found to give 100 percent kill and control of *Staphylococcus aureus*, *Bacillus subtilis* and *Mycobacterium phlei*. In each of the above determinations, the check nutrient agar supported a heavy growth of the test organisms.

In another representative operation, two vessels were prepared, each containing 50 milliliters of water. One vessel was maintained as a check and to the other water-containing vessel was added N,N'-methylenebis(3-carbamoyl-4-hydroxycoumarin) in an amount to equal 2 parts per million by weight of the water. Into each vessel were placed 25 healthy yellow fever mosquito larvae and the vessels were maintained under conditions conducive to the growth of the larvae. The vessels were so maintained for three days, at which time a mortality count was made. In such an operation, the check vessel was found to be supporting growing and healthy mosquito larvae and the test compound was found to give 100 percent kill and control of the larvae.

In another representative operation, N,N'-tetramethylenebis(3-carbamoyl-4-hydroxycoumarin) was employed for the control of two-spotted spider mites. In this operation, the compound was dispersed in a quantity of water to prepare an aqueous dispersion containing 500 parts of the test compound, as the sole active toxicant, per million parts by weight of ultimate dispersion. A stand of young cranberry bean plants, heavily infested with two-spotted spider mites, was thoroughly wetted with the dispersion. Thereafter the wetted plants were permited to dry and the dried plants held for a period of several days under conditions conducive to the continued growth of two-spotted spider mite populations. An untreated check stand of young cranberry bean plants heavily infested with two-spotted spider mites was held for the same period of time under the same conditions. As the end of the period, all of the plants were examined and it was found that in the stand of plants treated with the test compound, there was obtained a 100 percent kill and control of two-spotted spider mites, while on the check stand of plants, there was a heavy infestation of two-spotted spider mites.

In another representative operation, N,N'-4-methylphenylene-1,3-bis(3-carbamoyl-4-hydroxycourmarin) was found to give 100 percent kill and control of the American cockroach when an aqueous composition containing the compound, as the solid toxicant therein, at concentrations of 500 parts per million by weight of the ultimate composition was applied so as to contact the cockroaches.

In additional operations, N,N'-trimethylene-bis(3-carbamoyl-4-hydroxycoumarin) was found to give 100 percent kill and control of the plant pest, spiny clotbur, and N,N'-tetramethylenebis(3-carbamoyl-4-hydroxycoumarin) was found to give 100 percent kill and control of the plant pest, pigweed, when these test compounds were employed in compositions containing the compounds as the active agent and applied at a dosage of 10 to 50 pounds of the active agent per acre to soil containing viable seed of said pest species.

PREPARATION OF STARTING MATERIALS

The substituted 3-aminocarbamoyl-4-hydroxycoumarins may be prepared by condensation of one mole of 3-carboethoxy-4-hydroxycoumarin with one mole of the appropriate primary diamine ($NH_2$—R—$NH_2$) in the presence of a solvent such as nitrobenzene at temperatures in the range of 140°–150° C.

The 3-carboethoxy-4-hydroxycoumarin may be prepared by the reaction of diethylmalonate and acetylsalicylyl chloride in ice water to maintain the temperature between 5° and 10° C. and in the presence of sufficient 50 percent sodium hydroxide to maintain the pH of the mixture at 11. Water-insoluble material is then separated and sodium hydroxide is added to the remaining solution. A solid product is then separated and then boiled in water, acidified and cooled. This preparation is further described in U.S. Patent 2,449,038.

The methylene dibromide starting material is a commercial product and may be prepared by the direct reaction of methane and bromine in sunlight or by the reduction of tribromomethane or any other conventional method.

The 3-hydrazinocarbonyl-4-hydroxycoumarin may be prepared by heating the hydrazine salt of 3-hydrazinocarbonyl-4-hydroxycoumarin in nitrobenzene and washing the precipitate formed with methanol. The hydrazine salt of 3-hydrazinocarbonyl-4-hydroxycoumarin is prepared by the refluxing of 3-carboethoxy-4-hydroxycoumarin and hydrazine in methanol until a solid is formed and recovering the solid.

The 3-carbamoyl-4-hydroxycoumarin may be prepared by the reaction of one mole of 4-hydroxycoumarin and one mole of urea at temperatures of from 140°–150° C. An alternative procedure is the reaction of one mole of 4-hydroxycoumarin with one mole of ethyl carbamate in pyridine at a temperature of 190° C. In both procedures, the reaction mixture is cooled, diluted with methanol, filtered and the product may be crystallized from an acetic acid-methanol mixture employing standard procedures.

What is claimed is:

1. The compound corresponding to the formula

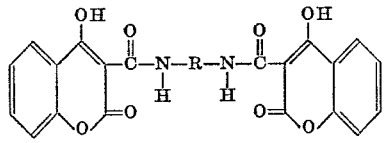

wherein R represents alkylene groups of 1 to 4 carbon atoms, phenylene or methylphenylene.

2. The compound of claim 1 wherein the compound is N,N' - methylenebis(3-carbamoyl-4-hydroxycoumarin).

3. The compound of claim 1 wherein the compound is N,N'-ethylenebis(3-carbamoyl-4-hydroxycoumarin).

4. The compound of claim 1 wherein the compound is N,N' - trimethylenebis(3-carbamoyl-4-hydroxycoumarin).

5. The compound of claim 1 wherein the compound is N,N' - tetramethylenebis(3-carbamoyl - 4-hydroxycoumarin).

6. The compound of claim 1 wherein the compound is N,N' - phenylene - 1,4-bis(3 - carbamoyl-4-hydroxycoumarin).

7. The compound of claim 1 wherein the compound is N,N' - 4 - methylphenylene - 1,3-bis(3-carbamoyl-4-hydroxycoumarin).

8. 1,2 - bis((4-hydroxy - 2-oxo - 2H-1 - benzopyran-3-yl)carbonyl)hydrazine.

References Cited

UNITED STATES PATENTS 3,122,557  2/1964  Molho _____ 260—343.2 XR
3,293,255  12/1966  Molho et al. ___ 260—343.2 XR J. M. FORD, Assistant Examiner U.S. Cl. X.R.
424—281